United States Patent
Carlstedt et al.

(10) Patent No.: US 7,641,029 B2
(45) Date of Patent: Jan. 5, 2010

(54) ANNULAR GROOVE MONOTUBE PISTON WITH NON-SYMMETRICAL BAND

(75) Inventors: Robert P. Carlstedt, Rochester Hills, MI (US); James J. Siesel, Canton, MI (US)

(73) Assignee: Ride Control, LLC, Troy, MI (US)

( * ) Notice: Subject to any disclaimer, the term of this patent is extended or adjusted under 35 U.S.C. 154(b) by 671 days.

(21) Appl. No.: 11/304,861

(22) Filed: Dec. 15, 2005

(65) Prior Publication Data
US 2007/0137957 A1    Jun. 21, 2007

(51) Int. Cl.
*F16F 9/00* (2006.01)

(52) U.S. Cl. .......................... 188/322.22; 188/322.15; 92/172

(58) Field of Classification Search ............ 188/322.15, 188/322.22; 92/172, 173, 181 R, 181 P, 208; 29/888.04, 888.049, 888.07
See application file for complete search history.

(56) References Cited

U.S. PATENT DOCUMENTS

| | | | | |
|---|---|---|---|---|
| 4,791,712 A | * | 12/1988 | Wells et al. | 29/888.042 |
| 5,038,897 A | * | 8/1991 | Wells et al. | 188/282.1 |
| 5,921,360 A | * | 7/1999 | Moradmand | 188/322.22 |
| 7,310,876 B2 | * | 12/2007 | May et al. | 29/888.04 |

FOREIGN PATENT DOCUMENTS

| | | | | |
|---|---|---|---|---|
| JP | 61116136 A | * | 6/1986 | |
| JP | 61116138 A | * | 6/1986 | |

\* cited by examiner

*Primary Examiner*—Pam Rodriguez
(74) *Attorney, Agent, or Firm*—Rader, Fishman & Grauer, PLLC

(57) ABSTRACT

A piston assembly for a monotube shock absorber includes a piston body with a non-symmetrical outer band that provides a bearing surface against a shock tube wall. The outer band defines a first diameter that is a maximum outer diameter of the piston assembly. The piston body also includes an outer surface portion that is defined by a second diameter less than the first diameter, and which comprises a non-contact surface. The outer band extends in a serpentine manner about an outer circumference of the piston body such that recesses are formed between the shock tube wall and the non-contact surface. Side ports are located within these recesses to allow a blow-off area to be increased by incorporating annular lands into the piston assembly.

16 Claims, 2 Drawing Sheets

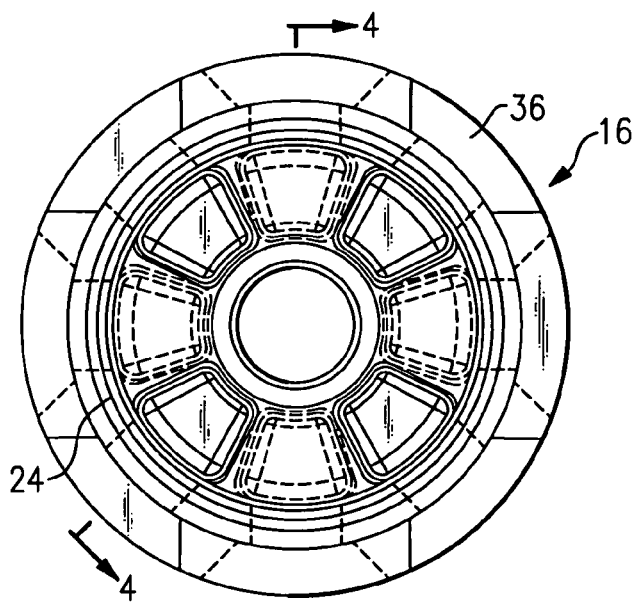 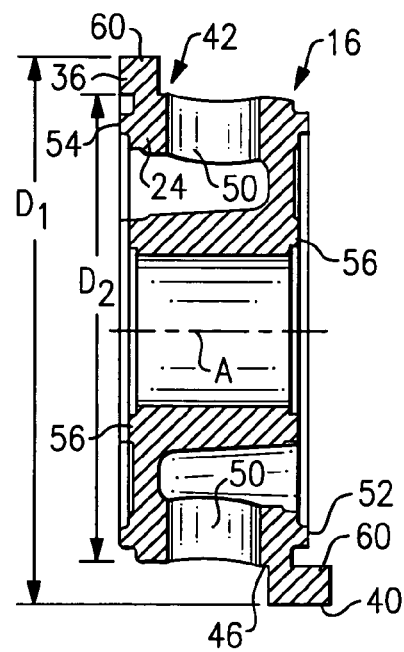
FIG.3  FIG.4
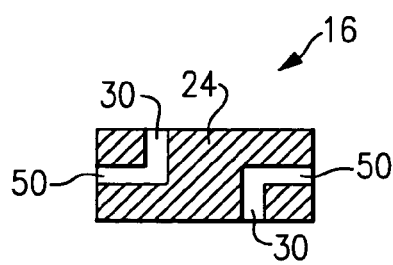 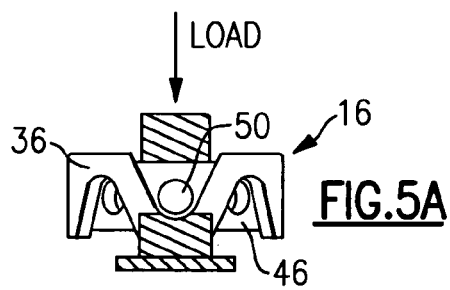
FIG.6  FIG.5A
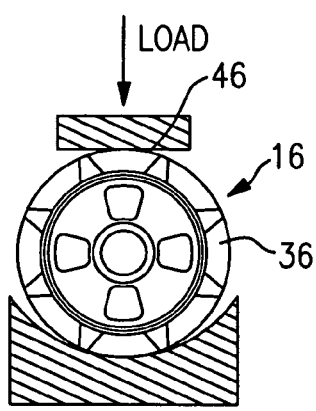 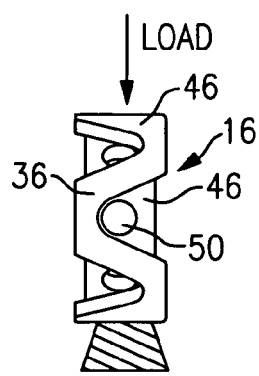
FIG.5B  FIG.5C

ANNULAR GROOVE MONOTUBE PISTON WITH NON-SYMMETRICAL BAND

BACKGROUND OF THE INVENTION

This invention generally relates to a piston for a monotube shock absorber that includes a tortuous outer band providing a bearing surface.

Monotube shock absorbers include a single tube defining an inner chamber that slidably receives a piston assembly connected to a rod. The piston assembly separates the inner chamber into a compression side and a rebound side. One type of piston assembly utilizes a "pod" piston. The pod piston includes a cylindrical body having a first surface facing the compression side and a second surface facing the rebound side. A plurality of inner ports is formed within the cylindrical body to allow fluid to flow between the compression and rebound sides. Valve discs are supported on the first and second surfaces to control fluid flow between the compression and rebound sides.

In a traditional pod piston design, a plurality of pods is formed on each of the first and second surfaces. Each pod forms a raised surface and is spaced apart from each adjacent pod by a recessed area. The pods provide tuning areas that facilitate blow-off. Tuning areas can be configured to control damping characteristics and blow-off as needed to help compensate for pressure build-ups. The pods are located in areas where pressure has a tendency to build-up.

Some disadvantages with this traditional pod piston design include limited area available for increasing the size of blow-off areas, and the unavailability of an adjustable preload. One solution to these problems involves using an annular piston configuration. An annular piston has a cylindrical body having a first annular land facing the compression side and a second annular land facing the rebound side. The annular piston has a larger blow-off area that is provided by the first and second annular lands.

A disadvantage with a traditional annular piston design is that it is often difficult to redirect fluid flow between compression and rebound sides of the annular piston. Redirection of fluid is typically from an outer circumferential area on one land to an inner circumferential area on the other land. Annular pistons have taken on various different configurations in an attempt to solve this problem. Examples of these annular pistons include cross-drilled pistons, double-piece pistons, and clash-tooled pistons. Each of these configurations requires time consuming machining and/or processing steps to provide flow passages between compression and rebound lands, which is expensive.

For the above reasons, it would be desirable provide an annular piston assembly for a monotube shock absorber that provides a larger blow-off area, and which provides a simplified and more cost effective configuration for controlling fluid flow between rebound and compression sides of the annular piston assembly.

SUMMARY OF THE INVENTION

A piston assembly includes piston body with a non-symmetrical outer band that extends in a tortuous manner about an outer circumference of the piston body. The outer band provides a bearing surface for a shock absorber.

The subject piston assembly is preferably incorporated into a monotube shock absorber, which includes a shock tube defining an inner cavity. The piston assembly is received within the shock tube and separates the inner cavity into a compression chamber and a rebound chamber. A piston rod is coupled to the piston assembly to move the piston assembly between rebound and compression positions. The outer band is in direct contact with an inner wall of the shock tube as the piston assembly moves between the rebound and compression positions.

The outer band defines a first diameter that is a maximum outer diameter of the piston assembly. The piston body also includes another outer surface portion that is spaced radially inwardly from the outer band. This outer surface is thus defined by a second diameter less than the first diameter, and comprises a non-contact surface. The outer band extends in a serpentine or twisting manner about an outer circumference of the piston body such that recesses are formed between the inner wall of the shock tube and the non-contact surface. Side ports are located within these recesses to allow blow-off area to be increased by incorporating annular lands into the piston assembly. Additional inner lands can be incorporated into the piston assembly to provide additional tuning features.

These and other features of the present invention can be best understood from the following specification and drawings, the following of which is a brief description.

BRIEF DESCRIPTION OF THE DRAWINGS

FIG. 3 is a top view of the piston assembly of FIG. 2.

FIG. 4 is a cross-sectional view of the piston assembly of FIG. 2 taken along section 4-4 as shown in FIG. 3.

FIG. 5A is a schematic representation of the piston assembly of FIG. 2 being subject to a first loading configuration.

FIG. 5B is a schematic representation of the piston assembly of FIG. 2 being subject to a second loading configuration.

FIG. 5C is a schematic representation of the piston assembly of FIG. 2 being subject to a third loading configuration.

FIG. 6 is a schematic cross-sectional view of a piston assembly incorporating the subject invention, and showing fluid communication between side and inner ports.

DETAILED DESCRIPTION OF THE PREFERRED EMBODIMENT

Figure 1:
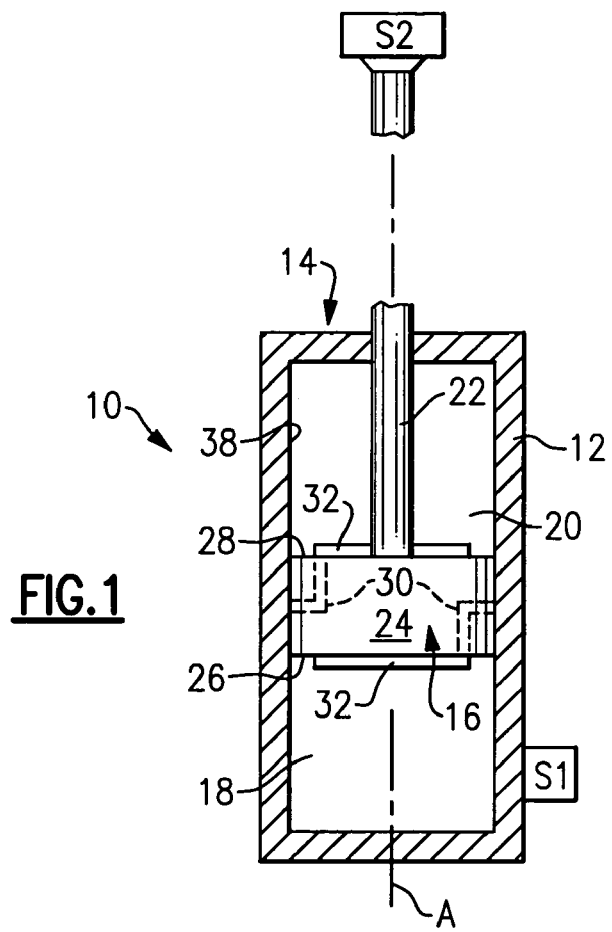
FIG. 1 is a schematic representation of a shock absorber with a piston assembly incorporating the subject invention.

A portion of a shock absorber assembly 10 is schematically shown in FIG. 1. The shock absorber assembly 10 is preferably a monotube design with an outer tube 12 that comprises a pressure tube defining a central axis A. The outer tube 12 is thus the sole tube of the shock absorber assembly 10, and consequently defines an inner cavity 14 for receiving a fluid. A piston assembly 16 is received within the outer tube 12 and separates the inner cavity 14 into a compression chamber 18 and a rebound chamber 20. A rod 22 is typically coupled to the piston assembly 16 to move the piston assembly 16 in a direction along the central axis A between compression and rebound positions as known.

The shock absorber 10 reacts between a vehicle wheel structure S1 and a vehicle frame structure S2 as known. In the example shown in FIG. 1, the rod 22 is coupled to the vehicle frame structure S2 and the outer tube 12 is coupled to the vehicle wheel structure S1, however, the reverse configuration could also be used.

The piston assembly 16 includes a cylindrical body portion 24 having a first surface 26 facing the compression chamber 18 and a second surface 28 facing the rebound chamber 20. At least one inner port 30 is formed within the cylindrical body portion 24 to allow fluid flow between the compression 18 and rebound 20 chambers. In the example shown, at least one inner port 30 is in fluid communication with the first surface 26 and at least one inner port 30 is in fluid communication with the second surface 28.

At least one valve disc 32 is supported on each of the first 26 and second 28 surfaces and cooperates with inner ports 30 to control fluid flow and damping characteristics. The structure and operation of the valve discs 32 are well known.

Figure 2:
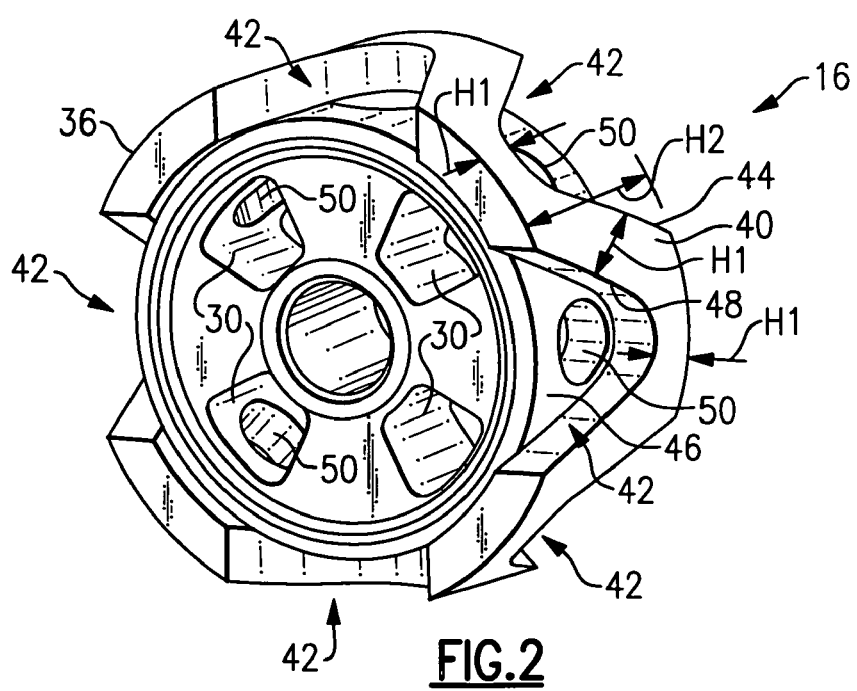
FIG. 2 is a perspective view of a piston assembly incorporating the subject invention.

As shown in FIGS. 2 and 3, the piston assembly 16 includes an outer band portion 36. The outer band portion 36 provides a bearing surface that directly engages an inner wall 38 (FIG. 1) of the outer tube 12. A nanocomposite material is sprayed onto an outer circumferential surface of the outer band portion 36. Nanocomposite materials typically include a Teflon® based material that provides a good bearing surface. Nanocomposite materials are well-known and any nanocomposite material or other similar material could be used on the piston assembly 16.

The outer band portion 36 extends tortuously about an outer circumference of the cylindrical body portion 24. Tortuous refers to something that has or is marked by repeated turns or bends, i.e. winding or twisting. The outer band portion 36 thus forms a wave-like, zigzag, serpentine, or tortuous engagement surface 40 that extends three hundred and sixty degrees (360°) about the central axis A. This configuration is very different from traditional outer band portions that provide a bearing surface.

Traditional pod piston designs and traditional annular piston configurations provide an outer bearing surface formed about an outer circumference of the cylindrical body. This outer bearing surface is traditionally formed as a band having a constant, symmetrical formation that continuously extends three hundred and sixty degrees (360°) about the outer circumference of the cylindrical body. This traditional band is a symmetrical band that is defined by a constant outer diameter and a constant height extending in a direction parallel to the central axis A.

The piston assembly 16 of the subject invention provides a non-symmetrical configuration by utilizing an outer band portion 36 with the tortuous engagement surface 40. The tortuous engagement surface 40 has an outermost compression side edge and an outermost rebound side edge longitudinally spaced apart from each other along the central axis A. The outer band portion 36 has a band height H1 that is less than a height dimension H2 extending from the outermost compression side edge to the outermost rebound side edge in a direction parallel to the central axis A.

The band height H1 is defined as a generally straight line extending between a first band edge 44 and a second band edge 48 opposite of the first band edge. The straight line intersects each of the first 44 and second 48 band edges at a right angle. The orientation of the band height H1 changes as the tortuous engagement surface 40 winds about the outer circumference of the cylindrical body portion 24. Thus, in certain locations the band height H1 will extend in a direction generally parallel to the central axis A, while in other locations the band height H1 will extend in a direction that is transverse to the central axis A.

By using the tortuous engagement surface 40, loading and flow characteristics for the piston assembly 16 are greatly improved. Recesses 42 (FIG. 2) are formed between the cylindrical body portion 24 and the inner wall 38 (FIG. 1) of the outer tube 12. The cylindrical body portion 24 is defined by a maximum outer diameter D1 (FIG. 4) at the outer band portion 36 having the tortuous engagement surface 40. The cylindrical body portion 24 also includes another outer circumferential surface portion 46 defined by a diameter D2 that is less than the maximum outer diameter D1. This outer circumferential surface portion 46 is a non-contact surface that is spaced apart from the inner wall 38 to from the recesses 42.

This unique configuration allows side ports 50 to be formed within the outer circumferential surface portion 46 of the cylindrical body portion 24 at the recesses 42. These side ports 50 can be drilled or preformed within the cylindrical body portion 24. As schematically shown in FIG. 6, the side ports 50 are in fluid communication with the inner ports 30 to facilitate fluid flow between the compression 18 and rebound 20 chambers (FIG. 1). As shown in FIG. 1, one inner port 30 is in fluid communication with the first surface 26 and one inner port 30 is in fluid communication with the second surface 28. Side ports 50 are in fluid communication with each of these inner ports 30 to define a fluid path through the cylindrical body portion 24. The cross-sectional view of FIG. 4 also shows fluid communication through the cylindrical body portion 24 between compression and rebound sides via the side ports 50.

Additionally, by using side ports 50, blow-off area can be increased by incorporating annular lands into the piston assembly 16. As shown in FIG. 4, a first annular land 52 is formed on one side of the piston assembly 16 and a second annular land 54 is formed on an opposite side of the piston assembly 16. The valve discs 32 (FIG. 1) are supported on the first 52 and second 54 annular lands. The outer band portion 36 extends longitudinally, in a direction parallel to the central axis A, beyond the first 52 and second 54 annular lands to form a skirt portion 60. The skirt portion 60 helps protect the valving provided by the valve discs 32.

Inner land areas 56 (FIG. 4), spaced inwardly toward the central axis A from the first 52 and second 54 annular lands, are also formed on the piston assembly 16. The inner land areas 56 provide low speed tuning and block reversal of bleeds. Rebound and compression bleeds are separated, which allows for improved control of damping characteristics at low speeds.

FIG. 5A shows loading on the piston assembly 16 in a direction parallel to the central axis A. FIGS. 5B and 5C show side loading on the piston assembly 16. The tortuous engagement surface 40 disperses side loading over a wider area compared to traditional designs.

The subject invention provides a unique piston configuration with full annular lands, a large blow-off area, and with low speed tuning. Additionally the piston assembly 16 is reversible, has adjustable pre-load with the use of shims, and a large adjustable high-speed flow area provided by the side ports.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A piston assembly for a shock absorber comprising:
a cylindrical body defining a central axis and having a first surface facing a compression side and a second surface facing a rebound side; and
an outer band portion extending tortuously about an outer circumference of said cylindrical body wherein said outer band portion has an outermost compression side edge and an outermost rebound side edge longitudinally spaced apart from each other along said central axis and wherein said outer band portion is defined by a band height that is less than a height dimension extending from said outermost compression side edge to said outermost rebound side edge in a direction parallel to said central axis, and wherein said band height is defined as extending between a first band edge and a second, band edge with said band height changing orientation relative to said central axis as said outer band portion winds about said outer circumference such that said band height is parallel to said central axis in certain orientations and is transverse to said central axis in other orientations.

2. A piston assembly for a shock absorber comprising:
a cylindrical body defining a central axis and having a first surface facing a compression side and a second surface facing a rebound side; and
an outer band portion having an outermost peripheral surface extending tortuously about an outer circumference of said cylindrical body
wherein said outer band defines a tortuous engagement surface that extends along a serpentine path and which is adapted for direct engagement with a cylinder wall.

3. The piston assembly according to claim 2 wherein said outer band portion has an outermost compression side edge and an outermost rebound side edge longitudinally spaced apart from each other along said central axis and wherein said outer band portion is defined by a band height that is less than a height dimension extending from said outermost compression side edge to said outermost rebound side edge in a direction parallel to said central axis.

4. The piston assembly according to claim 2 wherein said tortuous engagement surface is defined by a first outer diameter and wherein said cylindrical body includes an outer circumferential surface defined by a second outer diameter spaced inwardly from said first outer diameter toward said central axis wherein said outer circumferential surface comprises a non-contact surface.

5. The piston assembly according to claim 4 including at least one side port formed within said outer circumferential surface.

6. The piston assembly according to claim 5 wherein said cylindrical body includes at least one inner port in fluid communication with said at least one side port wherein said at least one side port and said at least one inner port cooperate to provide fluid communication between the compression side and the rebound side.

7. A shock absorber comprising:
a shock tube defining an inner cavity;
a piston assembly received within said shock tube to separate said inner cavity into a compression chamber and a rebound chamber, said piston assembly comprising a cylindrical body defining a central axis and having a first surface facing said compression chamber and a second surface facing said rebound chamber, and an outer band portion extending tortuously about an outer circumference of said cylindrical body said outer band defining a tortuous outer engagement surface adapted for direct engagement with an inner wall surface of said shock tube;
wherein said tortuous outer engagement surface extends in a serpentine manner about said outer circumference of said cylindrical body.

8. The shock absorber according to claim 7 wherein said shock tube comprises a monotube.

9. The shock absorber according to claim 7 including a piston rod coupled to said piston assembly wherein one of said piston rod and said shock tube includes structure for attachment to a vehicle wheel and the other of said piston rod and said shock tube includes structure for attachment to a vehicle frame.

10. The shock absorber according to claim 7 wherein said piston assembly includes at least one inner bore formed within said cylindrical body, and at least one valve disc associated with one of said first and said second surfaces, and wherein said at least one inner bore and said at feast one valve disc cooperate with each other to control fluid flow through said piston assembly.

11. The shock absorber according to claim 7 wherein said tortuous outer engagement surface is defined by a first outer diameter comprising a maximum outer diameter of said piston assembly, and wherein said cylindrical body includes an outer circumferential surface defined by a second outer diameter spaced radially inwardly from said first outer diameter toward said central axis and wherein said outer circumferential surface comprises a non-contact surface.

12. The shock absorber according to claim 7 including at least one side port extending through said cylindrical body from said outer circumference toward said central axis, said at least one side port being in fluid communication with at least one inner port to provide a fluid communication path between said compression and said rebound chambers.

13. The shock absorber according to claim 7 including a first annular land formed on said first surface and a second annular land formed on said second surface, said first and second annular lands each supporting at least one valve disc.

14. The shock absorber according to claim 13 wherein said outer band portion extends outwardly beyond at least one of said first and said second annular lands in a direction along said central axis to form a skirt portion.

15. The shock absorber according to claim 13 including at least one inner land area spaced radially inwardly relative to at least one of said first and second annular lands.

16. A piston assembly for a shock absorber comprising:
a cylindrical body defining a central axis and having a first surface facing a compression side and a second surface facing a rebound side;
at least one inner port formed within said cylindrical body;
a first outer surface extending about an outer circumference of said cylindrical body, said first outer surface forming a non-contact surface defined by a first diameter;
a second outer surface extending about the outer circumference of said cylindrical body and forming a contact surface for engaging an inner wall of a shock tube, said second outer surface comprising a band portion that extends in a serpentine path about said outer circumference of said cylindrical body, and wherein said contact surface is defined by a second diameter that is greater than said first diameter such that recesses are formed between the inner wall and said second outer surface on compression and rebound sides of said band portion; and
at least one side port formed in said second outer surface at one of said recesses, said at least one side port being in fluid communication with said at least one inner port to provide fluid communication between a compression chamber and a rebound chamber.

* * * * *